United States Patent
Bell et al.

(10) Patent No.: US 6,412,878 B1
(45) Date of Patent: Jul. 2, 2002

(54) DISPOSABLE WHEEL SHIELD

(76) Inventors: Henry O. Bell, 1266 Kyndal Way, Gardnerville, NV (US) 89410; Linda A. Grant, 5200 Summit Ridge Dr. #1711, Reno, NV (US) 89523

( * ) Notice: Subject to any disclaimer, the term of this patent is extended or adjusted under 35 U.S.C. 154(b) by 0 days.

(21) Appl. No.: 09/697,940

(22) Filed: Oct. 26, 2000

(51) Int. Cl.$^7$ ................................. B60B 7/00
(52) U.S. Cl. ..................... 301/37.104; 294/31.2; 16/110.1
(58) Field of Search ............... 301/37.1, 37.42, 301/37.31, 37.35, 37.36; 40/586, 587; 294/31.2; 16/110.1; 229/400, 402, 404

(56) References Cited

U.S. PATENT DOCUMENTS

| | | | |
|---|---|---|---|
| 2,378,750 A | * 6/1945 | Carew | |
| 2,914,826 A | * 12/1959 | Then | |
| 3,854,448 A | 12/1974 | Kromanaker | 118/502 |
| 4,030,649 A | * 6/1977 | Potoroka | |
| 4,792,191 A | * 12/1988 | Farmer | 301/37.1 |
| 4,874,206 A | 10/1989 | Sampson | 301/37.1 |
| 5,435,630 A | 7/1995 | Tucker | 301/37.1 |
| 5,524,972 A | 6/1996 | Cailor | 301/37.42 |

* cited by examiner

Primary Examiner—Russell D. Stormer

(57) ABSTRACT

The invention is a simple, inexpensive, disposable wheel shield suitable for protecting an automobile wheel during the application of a tire cleaner or dressing. The diameter of the shield may be adjusted by removing one or more of the five outer perforated concentric circles. A perforated circle in the center of the shield may be removed to accommodate a protruding four-wheel-drive front axle. The shield is held in place against the wheel by holding a push-out tab with one hand while applying cleaner to the tire with the other hand.

4 Claims, 2 Drawing Sheets

DISPOSABLE WHEEL SHIELD

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Field of the Invention

This invention relates to a shield to protect an automobile wheel while cleaning the tire, and more specifically, to an adjustable, disposable shield.

2. Description of Prior Art

Protective shields for vehicle wheels are not new to the automobile industry. When a tire-cleaning chemical is applied to a tire, and more particularly, the application of a spray-on tire cleaner or dressing, the result is an overspray or coating on the wheel or hubcap. This resulting overspray or coating may cause damage to the wheel or hubcap due to the chemicals contained therein, and may also look very unsightly.

Several types of wheel shields have been invented, but many are cumbersome and expensive to manufacture. U.S. Pat. No. 5,435,630, issued to Tucker, discloses a flexible lip for attaching the shield to the wheel rim, with a welded handle, all of which would be expensive to manufacture and cumbersome to use. U.S. Pat. Nos. 5,524,972, issued to Cailor, and 4,874,206, issued to Sampson, are other examples of wheel shields that are bulky, expensive, cumbersome, and are not adjustable. U.S. Pat. No. 4,792,191, issued to Farmer, discloses a wheel protector that is adjustable, but if the protector were to be stored flat, or folded, it would have to be re-sized at each use and, depending upon the finished size desired, would prove to be cumbersome.

Therefore, there is a need for a very inexpensive, simple, adjustable, and disposable shield to protect a wheel from a cleaner or resulting overspray when cleaning a vehicle tire.

BRIEF SUMMARY OF THE INVENTION

The present invention is a wheel shield, or flat disk, made of inexpensive, lightweight cardboard or paperboard. The outside diameter is the approximate size of the largest automobile wheel. Beginning at the outer edge, there are five perforated concentric circles, each smaller than the first and equally spaced from each other. When one of these perforated circles is torn or cut away, the result is a smaller shield adjusted for a smaller wheel diameter. With the series of five perforated concentric circles, the diameter of the shield may be reduced to fit smaller-sized wheel diameters. A smaller or larger shield can be produced to accommodate an infinite number of wheel sizes.

A perforated circle in the center of the shield may be removed to accommodate a protruding four-wheel-drive front axle. Located between the smallest perforated outer circle and the inner circle are three cuts that form a "U" shape, or a base and two legs, forming a push-out tab, or handle. The shield is held in place against the wheel by holding the handle with one hand while applying cleaner to the tire with the other hand.

Accordingly, several objects and advantages of my invention are:

(a) to provide a wheel shield which will protect a wheel from a coating of harmful chemicals or overspray when applying a cleaner or dressing to a vehicle tire;

(b) to provide a wheel shield which is simple to use;

(c) to provide a wheel shield which is easily portable from one tire to another;

(d) to provide a wheel shield which can be used for various sizes of wheels;

(e) to provide a wheel shield which is very inexpensive to manufacture; and (f) to provide a wheel shield which is disposable.

Further objects and advantages of my invention will become apparent from a consideration of the drawings and ensuing detailed description.

Figure 1:
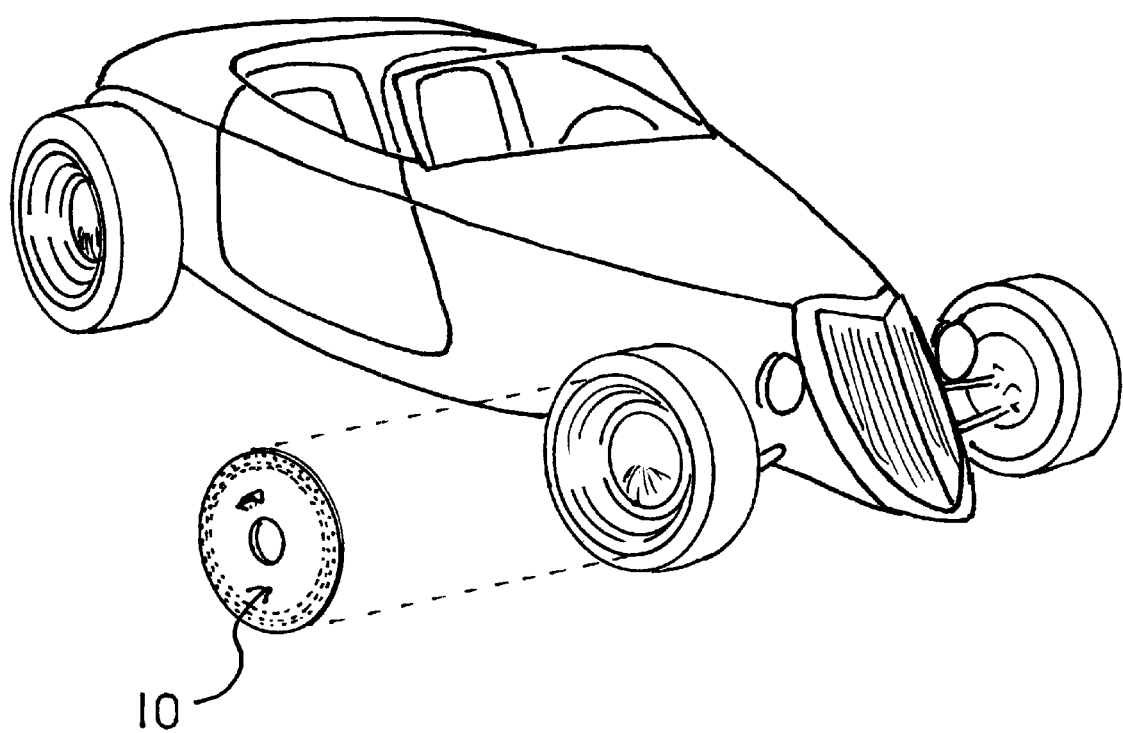
FIG. 1 is a perspective view of automobile showing how shield is used.
Figure 2:
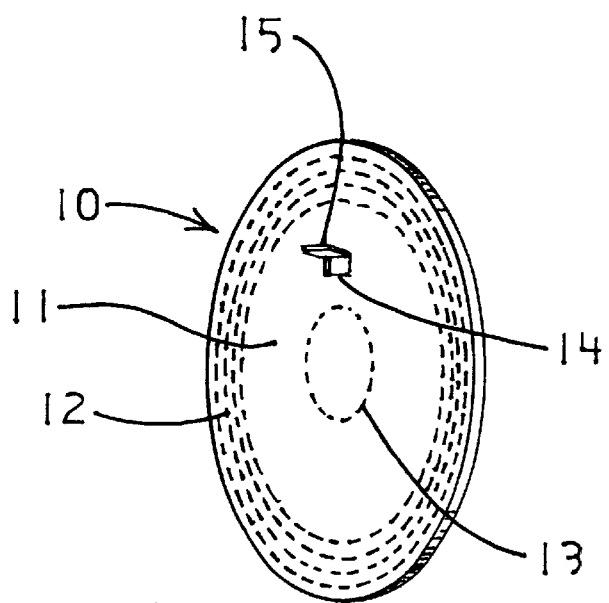
FIG. 2 is a perspective view of wheel shield.
Figure 3:
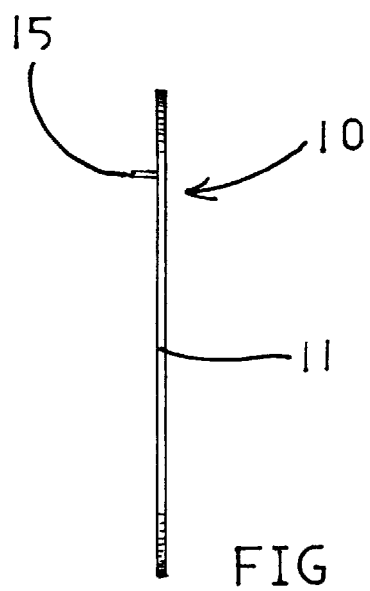
FIG. 3 is a side view with tab pushed out.
Figure 4:
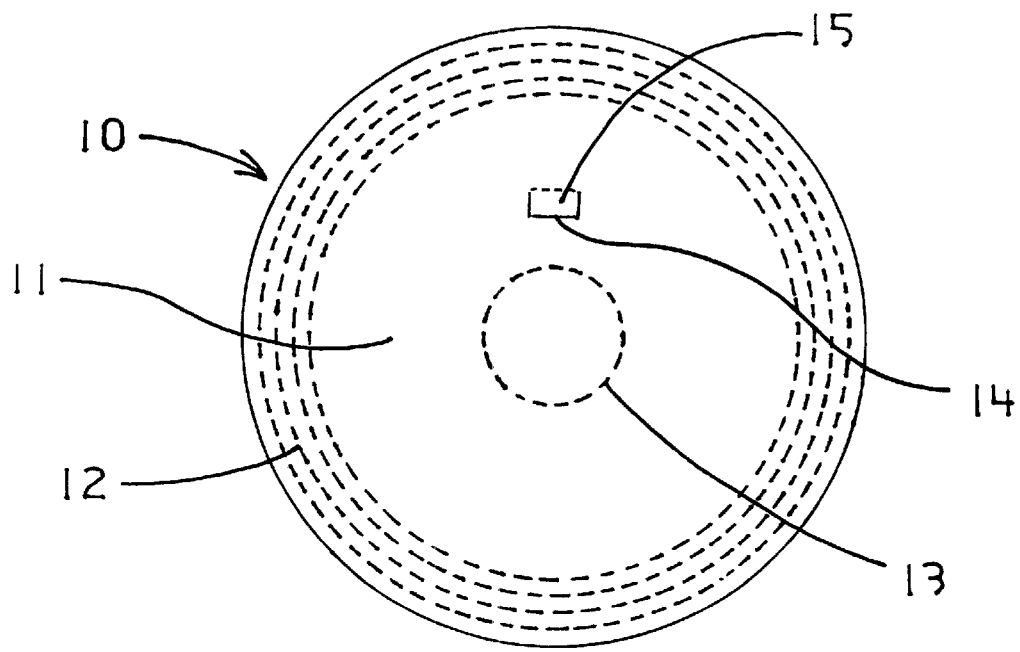
FIG. 4 is a plan view of wheel shield.

LIST OF REFERENCE NUMERALS 10 wheel shield
11 flat disk
12 outer perforated circles
13 inner perforated circle
14 "U" shape
15 tab

DETAILED DESCRIPTION OF THE INVENTION

The present invention is a wheel shield 10, or flat disk 11, made of inexpensive, lightweight cardboard or paperboard. A number of perforated concentric circles 12 ½" apart can be removed to produce a smaller diameter shield 10. The shield 10 may be reduced in diameter to fit all wheel diameters. A smaller or larger shield can be produced to accommodate an infinite number of wheel sizes.

There is a perforated circle 13 in the center of shield 10 that measures approximately 5" in diameter. When circle 13 is removed from shield 10, a resulting hole will accommodate a protruding four-wheel-drive front axle, allowing shield 10 to lay flat against a wheel. Located between the smallest outer perforated circle 12 and inner circle 13 are three cuts forming a "U" shape 14. Pushing on "U" shape 14 will cause it to pop out of disk 11, becoming perpendicular to the flat surface of disk 11, thus creating a handle or tab 15 with which to hold shield 10.

The user would determine the diameter of the wheel and, if necessary, remove an outer portion of disk 11, accomplished by tearing or cutting along the perforations of one of outer perforated circles 12, resulting in a proper fit of shield 10 to the user's wheel. By removing a ½" circle 12, the diameter of shield 10 is reduced 1"; by removing two ½" circles 12, the diameter of shield 10 is reduced by 2"; and so forth. If the user's wheel has a protruding front axle, such as for a four-wheel-drive vehicle, the user would remove inner perforated circle 13. The user would then push on the three cuts forming "U" shape 14 between inner circle 13 and the smallest outer circle 12, resulting in perpendicular tab 15 with which to grasp shield 10. The protective shield is held in place against the wheel with one hand while applying cleaner to the tire with the other hand, thus protecting the wheel from the cleaner.

Because the wheel shield is very inexpensive, it can be reused and discarded. Also, several shields can be purchased by one user and made to fit a variety of vehicle wheel sizes. After being adjusted to the desired diameter, when necessary, the shield becomes a permanent size and the user only needs to grasp the tab and hold the shield in place against the wheel with no further adjustments.

What we claim as our invention is:

1. A shield for protecting an automobile wheel, comprising:
   a flat disk of rigid material;
   a plurality of perforated concentric circles near the outside edge of the disk which, when removed from the outside diameter of said disk, allow the diameter of said disk to be reduced accordingly;
   a perforated circle or a plurality of concentric perforated circles spaced inward from the outside edge of the disk to which define an area of material, which, when removed, creates a hole in the center of the shield to allow a protrusion to extend through the shield when place on a wheel; and a plurality of cuts arranged in a U-shape in the shield to define a tab, such that
   when the tab is pushed out from the shield a handle is formed by the tab.

2. The wheel shield of claim 1, in which said rigid material is cardboard.

3. The wheel shield of claim 1, in which said rigid material is paperboard.

4. The wheel shield of claim 1, wherein the hole created in the center of the shield is adapted to receive a four-wheel-drive axle.

* * * * *